United States Patent [19]

El-Ibiary

[11] Patent Number: 5,439,296
[45] Date of Patent: Aug. 8, 1995

[54] BEARING HOUSING WITH TEMPERATURE SWITCH

[75] Inventor: Yehia El-Ibiary, Greenville, S.C.

[73] Assignee: Reliance Electric Industrial Company, Greenville, S.C.

[21] Appl. No.: 71,478

[22] Filed: Jun. 4, 1993

[51] Int. Cl.$^6$ .............................. F16C 32/00
[52] U.S. Cl. ........................ 384/448; 384/624
[58] Field of Search ................ 384/448, 624, 493

[56] References Cited

U.S. PATENT DOCUMENTS

| 3,373,300 | 3/1968 | Sullivan | 384/448 X |
| 4,721,399 | 1/1988 | Grosskurth et al. | 384/448 |
| 4,939,920 | 7/1990 | Stahl et al. | 384/493 X |

FOREIGN PATENT DOCUMENTS

| 217599 | 1/1985 | Germany | 384/448 |
| 85521 | 3/1990 | Japan | 384/448 |
| 2250785 | 6/1992 | United Kingdom | 384/448 |
| 1693284 | 11/1991 | U.S.S.R. | 384/448 |

Primary Examiner—Thomas R. Hannon
Attorney, Agent, or Firm—Dority & Manning

[57] ABSTRACT

A bearing assembly with a temperature switch embedded in the housing and arranged so as to be responsive to the temperature within the housing. The bearing assembly includes an indicator adapted to indicate the status of the temperature switch such that when a predetermined temperature is reached in the housing, the switch will be activated and the indicator will indicate that the predetermined temperature has been reached so that bearing failure can be prevented.

15 Claims, 2 Drawing Sheets

BEARING HOUSING WITH TEMPERATURE SWITCH

BACKGROUND OF THE INVENTION

The present invention relates generally to bearing housings and, more particularly, to a novel bearing housing with a temperature switch for signaling when a bearing or bearing assembly reaches a predetermined temperature.

Costly failures can occur when bearings in a bearing housing are operated above certain temperatures. Excessive temperatures in a bearing can result, for example, from inadequate bearing lubricant, misaligned bearings, or other abnormalities in the proper operation of the bearing assembly.

Certain types of stand alone thermocouples have been used to monitor bearing temperature in the past. A thermocouple generally comprises a pair of wires of dissimilar metals that are joined on one end and the free ends of the wires are connected to an instrument that measures the difference in potential created at the junction of the two metals. In prior applications, the typically spring loaded thermocouples were installed by drilling and threading a hole in the bearing housing. The thermocouple utilized includes a sheath that protects the thermocouple wires and a signal transmitter for connecting to the instrument, such as a voltmeter, that measures the difference in potential at the junction of the two metals. The cost of drilling and tapping a hole, along with the cost of the sheath that protects the thermocouple wires, the spring, and the connecting head that houses the signal transmitter together comprise a very expensive package. Thus, many users forego the use of the thermocouple and have no means for measuring the temperature in the bearing housing during operation.

SUMMARY OF THE INVENTION

The present invention recognizes and addresses the foregoing disadvantages, and others of prior art bearing assemblies.

Accordingly, it is an object of the present invention to provide an improved bearing housing with a temperature switch.

It is another object of the present invention to provide a low cost system for monitoring the temperature of bearings in a bearing housing.

It is another object of the present invention to provide an improved system for preventing bearing failure.

It is another object of the present invention to provide an improved bearing housing that includes an embedded temperature switch.

Still another object of the present invention is to provide an improved bearing housing with an indicator for signaling when a predetermined temperature in the housing has been reached.

A further object of the present invention is to provide an improved bearing housing with a temperature switch that generates a signal responsive to a predetermined temperature in the bearing housing.

These and other objects are achieved by providing an improved bearing assembly comprising a bearing housing, the bearing housing containing at least one bearing therein adapted to rotatably support a shaft in the housing. The bearing assembly further includes a temperature switch that is arranged in the housing so as to be responsive to the temperature within the housing.

These and other objects are also achieved by providing an improved bearing assembly comprising a bearing housing containing at least one bearing therein adapted to rotatably support a shaft in the housing. The bearing assembly further includes a temperature switch that is embedded in the housing and arranged so as to be responsive to the temperature within the housing. The improved bearing assembly further includes an indicator that is adapted to indicate the status of the temperature switch such that when a predetermined temperature is reached in the housing, the switch will be activated and the indicator will indicate that the predetermined temperature has been reached so that bearing failure can be prevented. The housing includes a shaft bore therein for receipt of the bearing, and further includes a switch receiving bore extending from an exterior surface of the housing toward the shaft bore and terminating prior to intersecting with the shaft bore.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
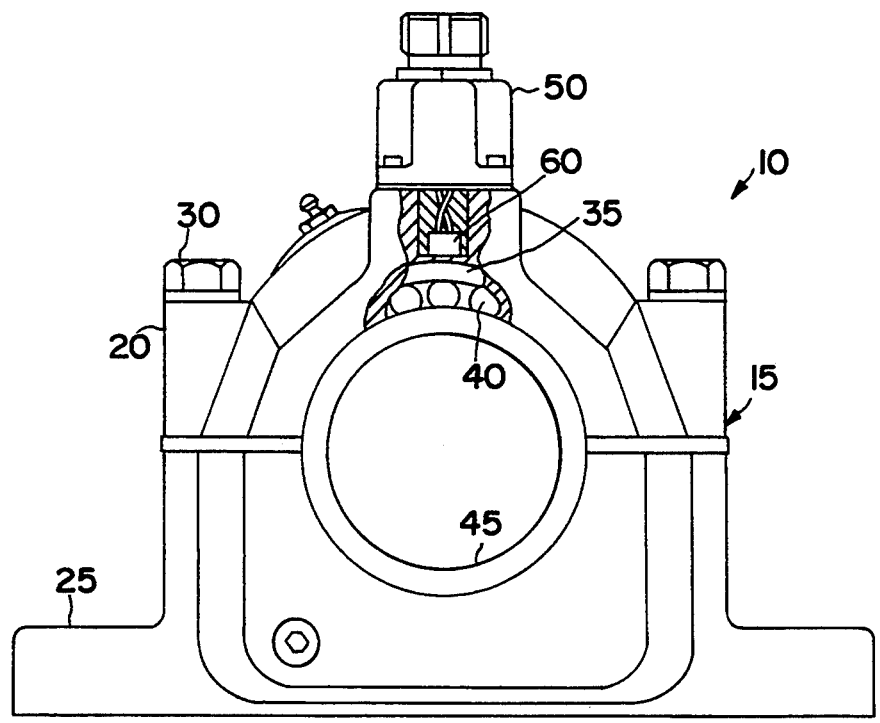
FIG. 1 is an end view with a partial cross-sectional area illustrating an improved bearing assembly in accordance with an embodiment of the present invention.
Figure 2:
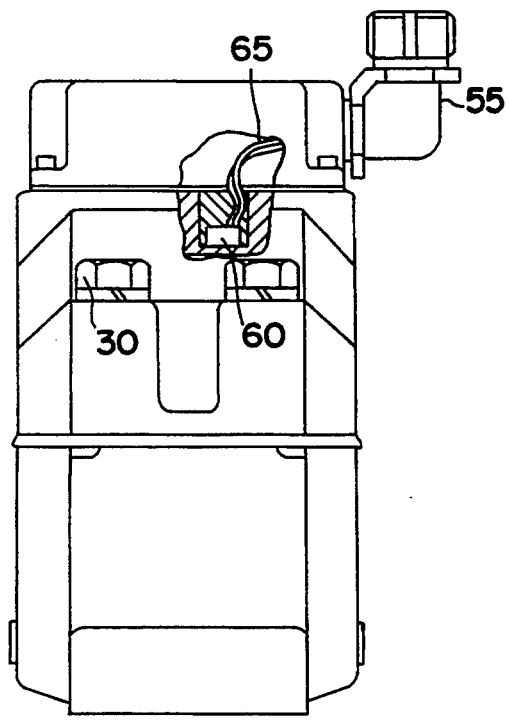
FIG. 2 is a side view of the bearing assembly of FIG. 1 with a portion illustrated in cross-section in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring to FIG. 1, an improved bearing assembly in accordance with an embodiment of the present invention is illustrated at 10. Bearing assembly 10 includes a housing 15 with an upper section 20 and a lower section 25. Upper section 20 and lower section 25 may be secured together by bolts 30 or any other suitable means. It should be appreciated that the particular type bearing housing or assembly utilized may vary depending on the application desired and is not critical to the present invention. One example of a suitable bearing assembly would be the UNIFIED SAF pillow block design sold by Reliance Electric Industrial Company, the assignee of the present invention.

Figure 3:
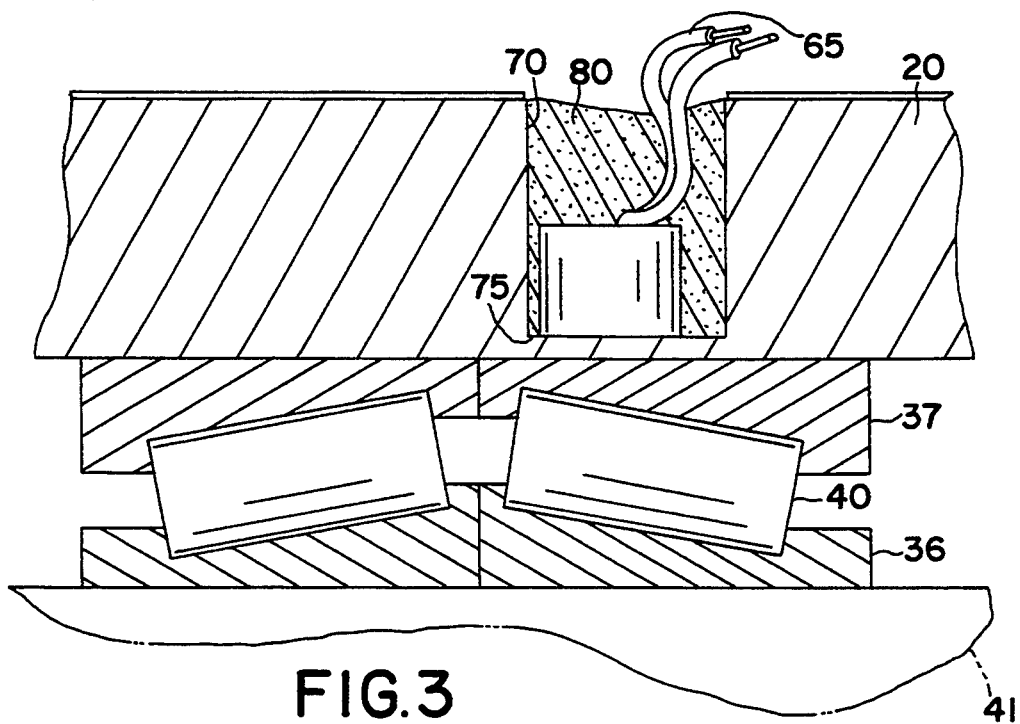
FIG. 3 is a detailed cross-sectional view of the cross-sectioned area of FIG. 2.

Housing 15 contains at least one bearing 35 which may be of any conventional nature. As illustrated in FIGS. 1 and 3, bearing 35 includes an inner race 36 and an outer race 37 maintaining therebetween rollers 40. Bearing 35 is adapted to support a shaft, such as 41, therein for rotation with respect to said housing. Housing 15 further defines a shaft bore 45 for receipt of the shaft 41.

In accordance with the present invention, upper section 20 of housing 15 includes a temperature switch 60 provided in a switch receiving bore 70 in the housing that extends from an exterior surface of the housing toward the shaft bore. Switch receiving bore 70 terminates prior to entry into the shaft bore. In other words, a portion of material illustrated at 75 remains between switch receiving bore 70 and shaft bore 45 or outer race 37. The thickness of portion 75 is determined so that the temperature at the temperature switch will be accurately representative of the bearing temperature. Portion 75 is provided to protect temperature switch 60 from grease and other contaminants from within the shaft bore. While the thickness of portion 75 may vary depending on the housing material and size of the bearing and like considerations, in one embodiment, a thickness of approximately 1/16 inch has been determined to be appropriate. As can be easily seen in FIG. 3, the receiving bore 70, and thus temperature switch 60, may be located offset from a plane passing through the center of the bearing perpendicular to the direction of the shaft bore.

Temperature switch 60 is secured in switch receiving bore 70 with an adhesive 80 as best illustrated in FIG. 3. Adhesive 80 may be any type known adhesive material such as, for example, an epoxy. Temperature switch 60 further includes electrical wires 65 for connecting to an indicator as generally indicated at 85. A monitor cover 50 is provided to protect the temperature switch and switch receiving bore and includes a liquid tight fitting 55 that the switch wires 65 extend through for connection to indicator 85.

Figure 4:
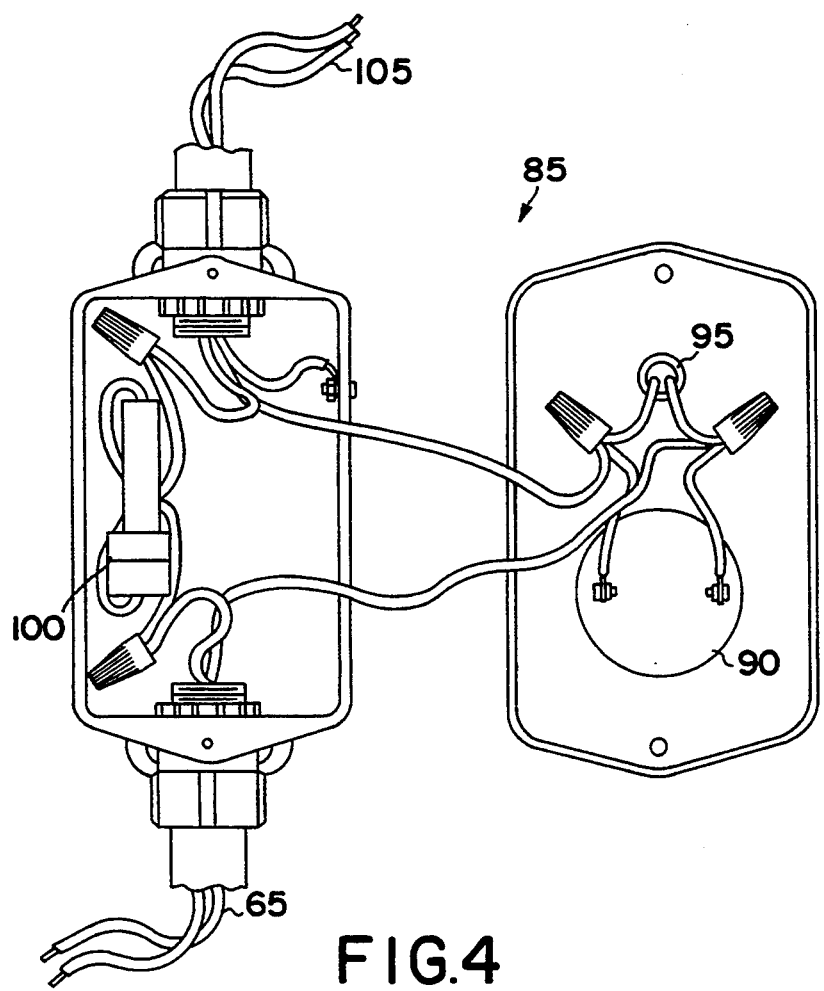
FIG. 4 is a perspective view of the indicator of an embodiment of the present invention including its wiring.

FIG. 4 illustrates the electrical wiring of the indicator in one embodiment of the present invention. As illustrated in FIG. 4, indicator 85 may include an audible alarm 90 which may be, for example, a buzzer. Indicator 85 may also include a visible alarm 95 which may, for example, include an indicator light. In a preferred embodiment, switch wires 65 may be connected in a wiring box through fuse assembly 100 to a power source (not shown) through wires 105 and also to visible alarm 95 and audible alarm 90 as would be clear to one skilled in the art. While a preferred wiring design is illustrated in FIG. 4, it should be appreciated by one skilled in the art that any suitable wiring system may be utilized including the elimination or substitution of the audible and visible alarms, 90 and 95. In addition, the indicator can be placed in any desired location and need not be proximate to the bearing assembly.

It should be appreciated that any type of temperature switch 60 may be utilized. In operation, a temperature switch is selected that opens or closes in response to a particular preset temperature. When the preset temperature is reached, switch 60 is activated to thereby send a signal to visible and/or audible alarms 90 and 95 to thereby notify an operator of excessive heat build up in the bearing assembly. While any suitable temperature switch may be utilized, an example of one suitable temperature switch would be the Model B-11 manufactured by Cantherm Company of Montreal, Canada. Such a temperature switch may have, for example, a temperature setting of 105° F. and operate on a voltage of 115 volts. It should be appreciated that either alternating or direct current may be specified as well as varying voltages and temperatures. For use in monitoring temperature in the bearing assembly, a normally open switch is preferable. A normally closed switch could also be utilized such as, for example, for control functions in a bearing assembly system. It should be appreciated that one skilled in the art could readily adapt either an open or closed switch for either purpose.

A preferred temperature sensor includes a bimetallic disk in the temperature sensor that pops up when a predetermined temperature is reached, as is well known in the art. It should be appreciated that any suitable type temperature switch could be utilized in the present invention depending on the desired characteristics of operation. In addition, the style of bearing housing, the materials utilized therein, the type of bearings, and the material used to secure the switch in the housing may all vary within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An improved bearing assembly, said bearing assembly comprising:
   a) a bearing housing, said bearing housing containing at least one bearing therein adapted to rotatably support a shaft in said housing, wherein said housing includes a shaft bore therein for receipt of said bearing, said housing further including a switch receiving bore extending from an exterior surface of said housing toward said shaft bore, wherein said switch receiving bore terminates prior to intersecting with said shaft bore;
   b) a temperature switch, said temperature switch being arranged in said housing so as to be responsive to the temperature within said housing so that said switch will be activated when a predetermined temperature in said housing is reached.

2. An improved bearing assembly as in claim 1, and further including an indicator, said indicator being adapted to indicate the status of said temperature switch.

3. An improved bearing assembly as in claim 2, wherein said indicator includes an audible alarm.

4. An improved bearing assembly as in claim 2, wherein said indicator includes a visual alarm.

5. An improved bearing assembly as in claim 1, wherein said switch is normally open.

6. An improved bearing assembly as in claim 1, wherein said switch is normally closed.

7. An improved bearing assembly as in claim 1, wherein said switch is embedded in said shaft receiving bore.

8. An improved bearing assembly as in claim 7, wherein said switch is secured against movement in said shaft receiving bore by an adhesive.

9. An improved bearing assembly comprising:
   a) a bearing housing containing at least one bearing therein adapted to rotatably support a shaft in said housing, wherein said housing includes a shaft bore therein for receipt of said bearing, said housing further including a switch receiving bore extending from an exterior surface of said housing toward said shaft bore and terminating prior to intersecting with said shaft bore;

b) a temperature switch, said temperature switch being embedded in said housing and arranged so as to be responsive to the temperature within said housing; and c) an indicator, said indicator being adapted to indicate the status of said temperature switch such that when a predetermined temperature is reached in said housing, said switch will be activated and said indicator will indicate that said predetermined temperature has been reached so that bearing failure can be prevented.

10. An improved bearing assembly as in claim 9, wherein said switch receiving bore terminates approximately 1/16 inch prior to intersecting said shaft bore.

11. An improved bearing assembly as in claim 9, wherein said indicator includes an audible alarm.

12. An improved bearing assembly as in claim 9, wherein said indicator includes a visual alarm.

13. An improved bearing assembly as in claim 9, wherein said temperature switch is an on-off switch.

14. An improved bearing assembly as in claim 9, wherein said temperature switch is located offset from a plane passing through a center of said at least one bearing perpendicular to the axial direction of said shaft bore.

15. An improved bearing assembly as in claim 9, wherein said temperature switch is embedded in said shaft receiving bore and secured against movement therein by an adhesive.

* * * * *